US008001886B1

(12) United States Patent
Lassota

(10) Patent No.: US 8,001,886 B1
(45) Date of Patent: Aug. 23, 2011

(54) METHOD OF MAKING A BEVERAGE INGREDIENT FILTER

(75) Inventor: Zbigniew G. Lassota, Long Grove, IL (US)

(73) Assignee: Food Equipment Technologies Company, Inc., Lake Zurich, IL (US)

( * ) Notice: Subject to any disclaimer, the term of this patent is extended or adjusted under 35 U.S.C. 154(b) by 1931 days.

(21) Appl. No.: 11/006,798

(22) Filed: Dec. 7, 2004

(51) Int. Cl.
*B30B 13/00* (2006.01)
*B01D 39/16* (2006.01)
(52) U.S. Cl. ............... 100/35; 264/DIG. 48; 210/496
(58) Field of Classification Search ............ 100/35, 100/37; 210/496, 497.01, 497.02, 497.03, 210/493.5, 499, 497.2, 497.3; 264/DIG. 48
See application file for complete search history.

(56) References Cited

U.S. PATENT DOCUMENTS 3,138,695 A * 6/1964 Bracich ............... 219/244
5,298,267 A * 3/1994 Gruenbacher ............ 426/77
5,417,906 A * 5/1995 Chiodo ................. 264/153
5,633,026 A * 5/1997 Gruenbacher ............ 426/77
6,662,955 B1 * 12/2003 Lassota ................. 210/482

* cited by examiner

*Primary Examiner* — Jimmy T Nguyen
(74) *Attorney, Agent, or Firm* — James W. Potthast; Potthast & Associates

(57) ABSTRACT

Beverage ingredient filter (10) having a inwardly located, filtering, section (12) of water permeable filter paper (11) and an outwardly located, water impervious, nonfiltering outer section (14) joined to the surrounding the inner filtering section (12). The beverage ingredient filter (10) is made by forming, from water permeable paper filter stock having a porous structure, the inner section (12) defining the bottom surrounded by the outer section (14) defining an encircling cylindrical wall, and altering the outer section (14) to render the outer portion (14) water impermeable. Altering may be performed by dimensionally reducing the porous structure of the outer section relative to the inner section until it is substantially water impervious relative to the inner section (12), securing together the porous structure after the porous structure has been dimensionally reduced, and holding the outer section in a dimensionally reduced, nonporous state relative to the inner section.

20 Claims, 4 Drawing Sheets

US 8,001,886 B1

METHOD OF MAKING A BEVERAGE INGREDIENT FILTER

BACKGROUND OF THE INVENTION

1. Field of the Invention

This invention generally relates to a method of making a beverage ingredient filter used for brewing a freshly brewed beverage, such as freshly brewed coffee or tea.

2. Description of the Related Art Including Information Disclosed Under 37 CFR 1.97-1.99

In known beverage ingredient filter assemblies used in commercial brewers, the beverage ingredient is held within a truncated conical filter paper that, in turn, is held within and supported within a filter holder. The filter holder in turn is removably mounted within a brew basket mounted for movement between a brew position beneath a beverage dispense opening and an unloading/loading position spaced from the dispenser for removal and insertion of the filter holder.

As described in the U.S. Pat. No. 6,148,717, the shape of the filter holder and the manner in which the hot water is passed through the beverage ingredient within the filter results in uneven saturation of the ingredient. This problem is overcome in part by holding the ingredient in a uniform layer, preferably in a cylindrical shape.

In the case of nondisposable artificial nonfilters made of gold mesh and the like small, particles of the beverage pass through the filter and enter into the beverage. There are some indications that consumption of particulate coffee grounds can contribute to the possibility of a person contracting cancer.

While known beverage ingredient paper filters stop such particle from entering the beverage, the inventor has determined that they fail to provide for a uniform flow of hot water through a uniform level of ingredient. This is due in part to the truncated conical shape of the known filter papers. The inventor has also determined that uniform saturation would not be possible even if the shape were corrected because of uniform filtering throughout the paper coffee filter.

SUMMARY OF THE INVENTION

It is therefore the principal objective of the present invention to provide a method of making a beverage ingredient filter that overcomes the disadvantages of known filters.

This objective is partly achieved by providing a method of making a beverage ingredient filter by performance of the steps of forming, from water permeable paper filter stock having a porous structure, a filter having an inner section defining a bottom surrounded by an outer section defining an encircling wall, and altering the outer section to render the outer portion water impermeable.

Preferably, the method of claim includes the step of dimensionally reducing the porous structure of the outer section relative to the inner section until it is substantially water impervious relative to the inner section. The step of altering may include the steps of fusing together the porous structure after the porous structure has been dimensionally reduced, and holding the outer section in a dimensionally reduced, nonporous state relative to the inner section through the holding power of the fusion after the step of dimensionally reducing the porous structure has terminated. Preferably, the step of fusing includes the step of simultaneously pressing together the opposite sides of the outer section and heating the outer section. The outer section is preferably folded to form a substantially cylindrical wall extending upwardly from the inner section after the step of altering to form a substantially cylindrical filter with a permeable bottom and an impermeable substantially cylindrical side wall.

The objective is also acquired in part by providing a method of making a beverage ingredient filter by performing the steps of forming, from water impermeable paper-like stock, a body having an inner section defining a bottom surrounded by an outer section defining an encircling wall, and altering the inner section to render the inner section water impermeable. The step of altering includes the step of mechanically altering the inner section by forming a In such case, preferably the step of mechanically altering the inner section includes the step of forming a matrix of micro holes by piercing the inner section with a plurality of piercing needles. Alternatively, the inner section carries a water tight sealant that renders the inner section water impermeable and the step of mechanically altering the inner section includes the step of degrading the sealant to render it relatively ineffective. The step of degrading may include one or more of the steps of (a) heating the inner section to melt the sealant, (b) applying a solvent to the inner section to dissolve the sealant and (c) applying a reactant to alter the chemical composition of the sealant.

Additionally, the objective of the invention is obtained by providing a method of making a beverage ingredient filter by performance of the steps of joining an inner section of water permeable material to an outer section made of water impermeable material surrounding the inner section, and folding the outer section to form a generally cylindrical shape with the inner section defining a round bottom and the outer section defining a substantially cylindrical wall.

Achievement of the objective of the invention is also obtained in part by providing a method of making an open, empty beverage ingredient filter by performing the steps of forming a relatively inwardly located, filtering, bottom section of beverage ingredient filter paper for support of beverage ingredient resting on the bottom section, the entire bottom section being continuously uniformly porous to allow a uniform flow of beverage uniformly and continuously across the entire bottom section, forming a relatively outwardly located, nonfiltering, non-porous, side wall section of beverage ingredient filter paper, continuously and contiguously joining the side wall section to and surrounding the inner, bottom filtering section of beverage ingredient filter paper, and extending the side wall section upwardly from the bottom to define a nonporous substantially cylindrical side wall being entirely and continuously nonporous from the bottom section to at least adjacent an open top through which ingredient may be dumped directly onto the bottom section, said nonporous substantially cylindrical side wall guiding water through substantially the full thickness of any ingredient being supported by the bottom and through all and only the filtering bottom section.

The object of the invention is also achieved by providing a method of making an open, empty, beverage ingredient filter assembly by performing the steps of forming a flexible filter having an inner flat section and an outer wall section, said inner bottom section being entirely made of continuously uniformly water permeable filter material and said outer wall section being entirely made of nonfiltering, water impermeable material continuously and contiguously joined to and surrounding the inner section, and inserting the flexible filter into a relatively rigid filter holder with the inner flat section of the filter resting on a flat bottom of a holder with a flat bottom that is substantially, continuously, uniformly porous to enable uniform and continuous flow of beverage across the entire bottom section of the filter, and the outer wall section being laterally supported in a configuration conforming to a side wall of the holder in an upright position perpendicular to the flat bottom and extending upwardly from the bottom to an open top.

If the holder is made of reusable material, then the method includes the step of making another filter assembly by inserting another filter into the filter holder after a first filter has been removed from the holder after use.

BRIEF DESCRIPTION OF THE DRAWINGS

The forgoing objects and advantages features of the invention will be explained in greater detail and others will become more apparent from detailed description of the preferred embodiment of the present invention which is given with reference to the several figures of the drawing, in which.

DESCRIPTION OF THE PREFERRED EMBODIMENT

This application in substantial part includes the subject matter of U.S. Pat. No. 6,662,955 B1 issued to the present inventor on Dec. 16, 2003, and entitled "Beverage Ingredient Filter and Assembly", which is hereby incorporated by reference.

Figure 1A:
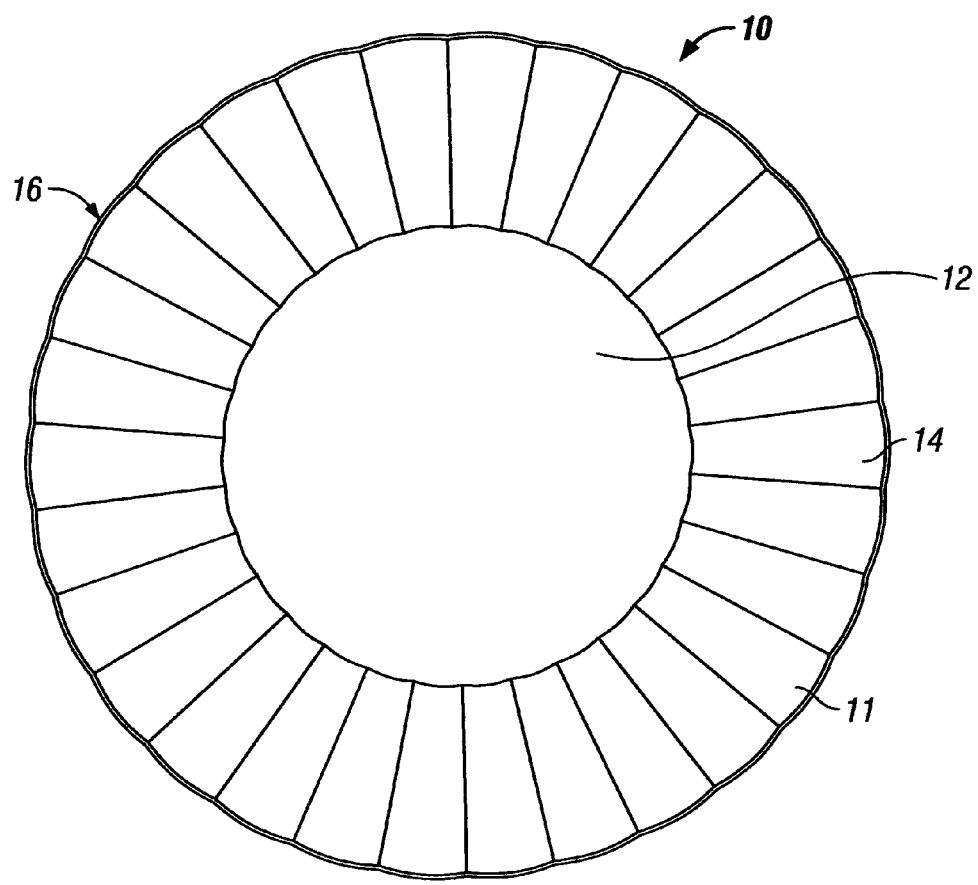
FIG. 1A is a plan view of the paper filter of the preferred embodiment showing the inner section and the outer section.
Figure 1B:
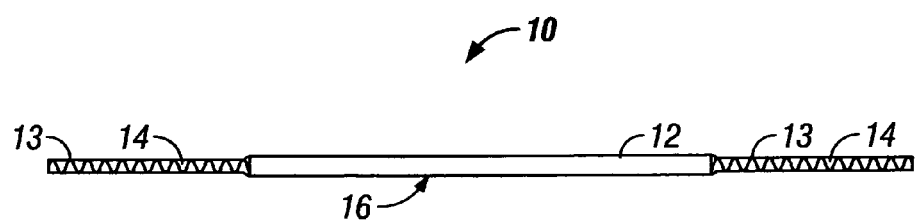
FIG. 1B is a side elevation view of FIG. 1A.

Referring now to FIGS. 1A and 1B, the preferred embodiment the beverage ingredient filter 10 has a relatively inwardly located, filtering, inner section 20 made of water permeable filter paper. A relatively outwardly located, water impervious and nonfiltering outer section 14 of the beverage ingredient filter is continuously joined to and surrounds the inner filtering section 12. The inner section 20 is integrally formed and joined with the outer section 14, both sections being made from a single piece of filter paper 11. Each of the sections 14 and 12 initially has the same filtering capacity but the outer section 14 is altered to dimensionally reduce relative to the inner section 20 the porous structure 13 of the outer section 14 until it is substantially water impervious relative to the inner section 12. Preferably, heat from a hot iron platen or other flat heated metal or other material is pressed against the outer section 14 to flatten and fuse the porous structure of the outer section 14 By fusing together the porous structure of the outer section 14 in a dimensionally reduced state relative to the inner section. This fusing holds the outer section 14 in the dimensionally reduced state in which it is relative impervious to water.

Figure 1C:
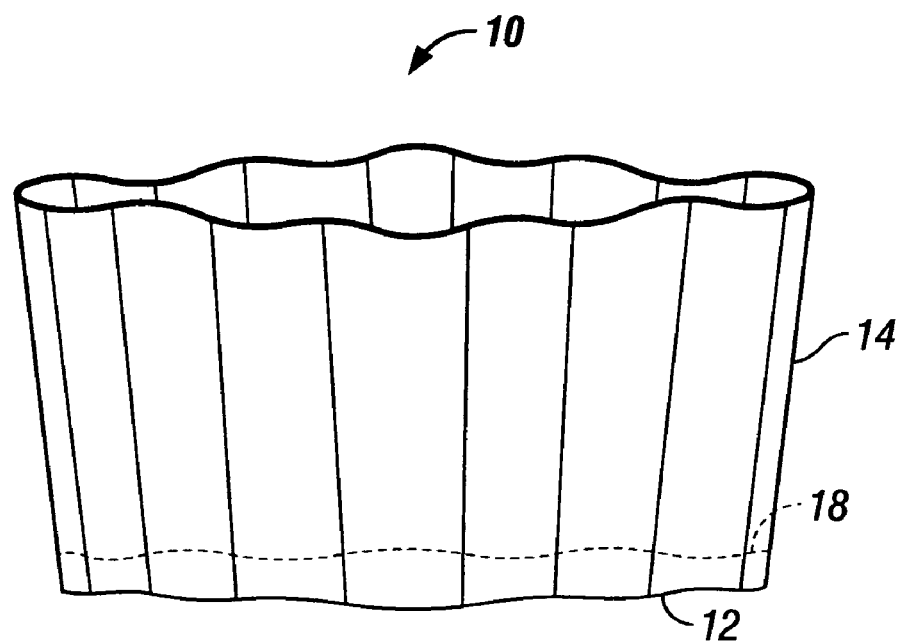
FIG. 1C is a side view of the paper filter of FIG. 1A with the outer section in a generally perpendicular arrangement.

Referring now to FIG. 1C, after reduction of the porous structure of the outer section 14 of the ingredient filter 10, the outer section 14 is bent perpendicular to the inner section 12 to form a generally cup-shaped configuration. The outer section forms a generally cylindrical side wall that forms the round section 12 defining the bottom of the cup-like configuration for holding the ingredient 18 to be brewed.

Figure 2A:
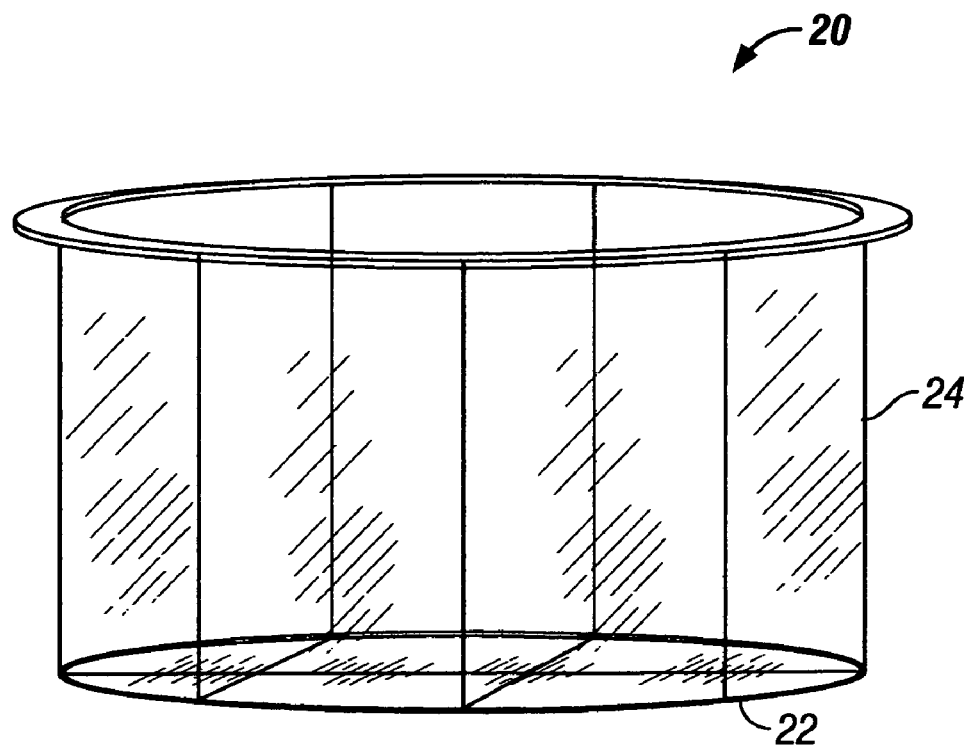
FIG. 2A is a side elevation view of a filter basket having porous side walls.
Figure 2B:
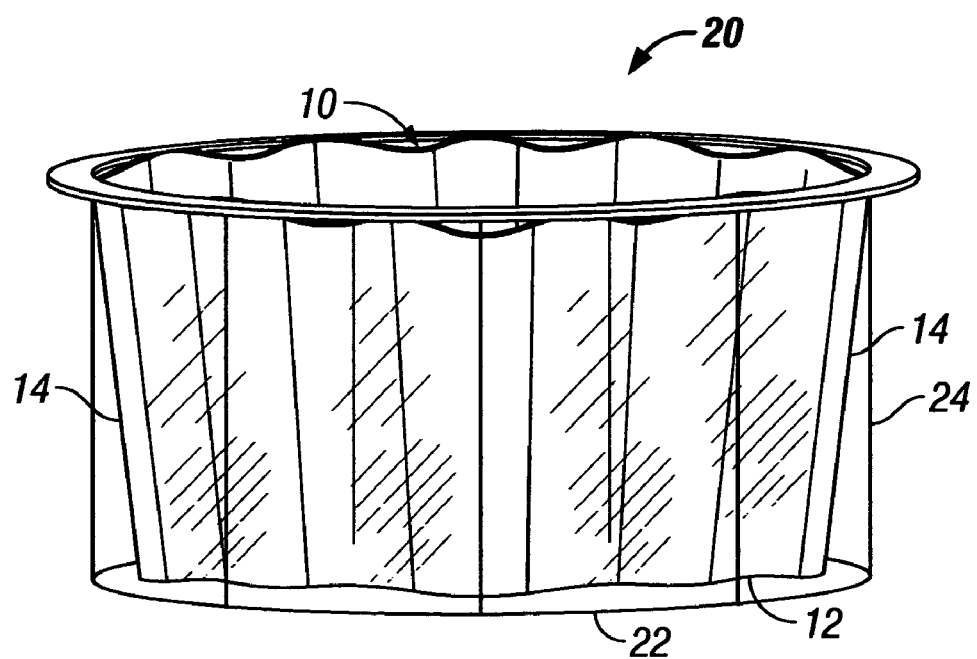
FIG. 2B is a side perspective view showing the paper filter in placed within the filter basket.
Figure 3:
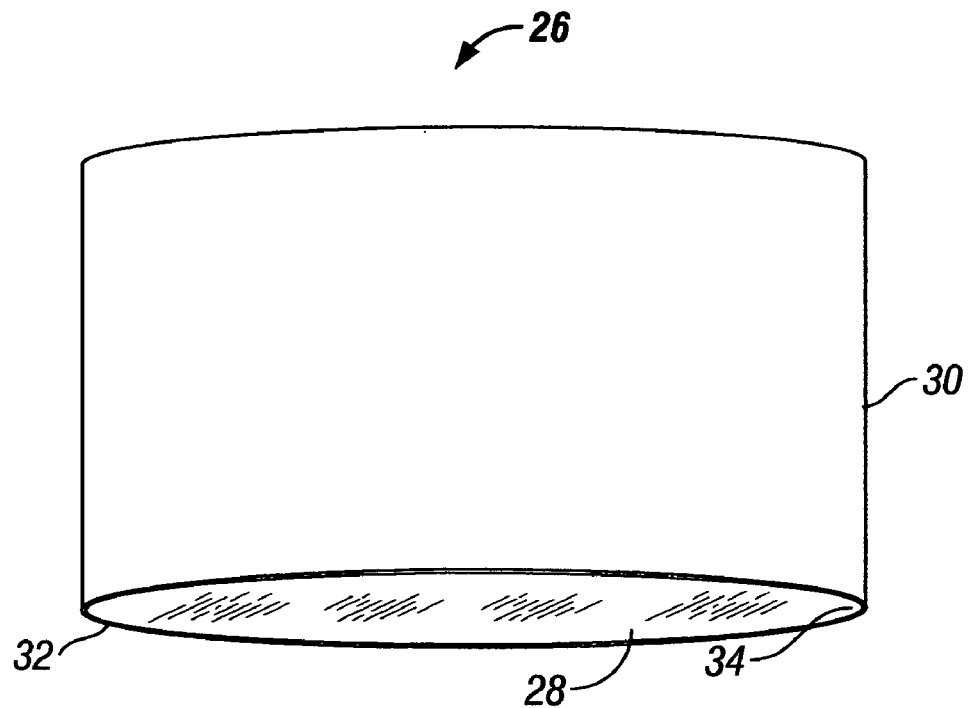
FIG. 3 is a perspective view of another beverage ingredient filter having an inner section made of water pervious material and another section made of water impervious material.
Figure 4:
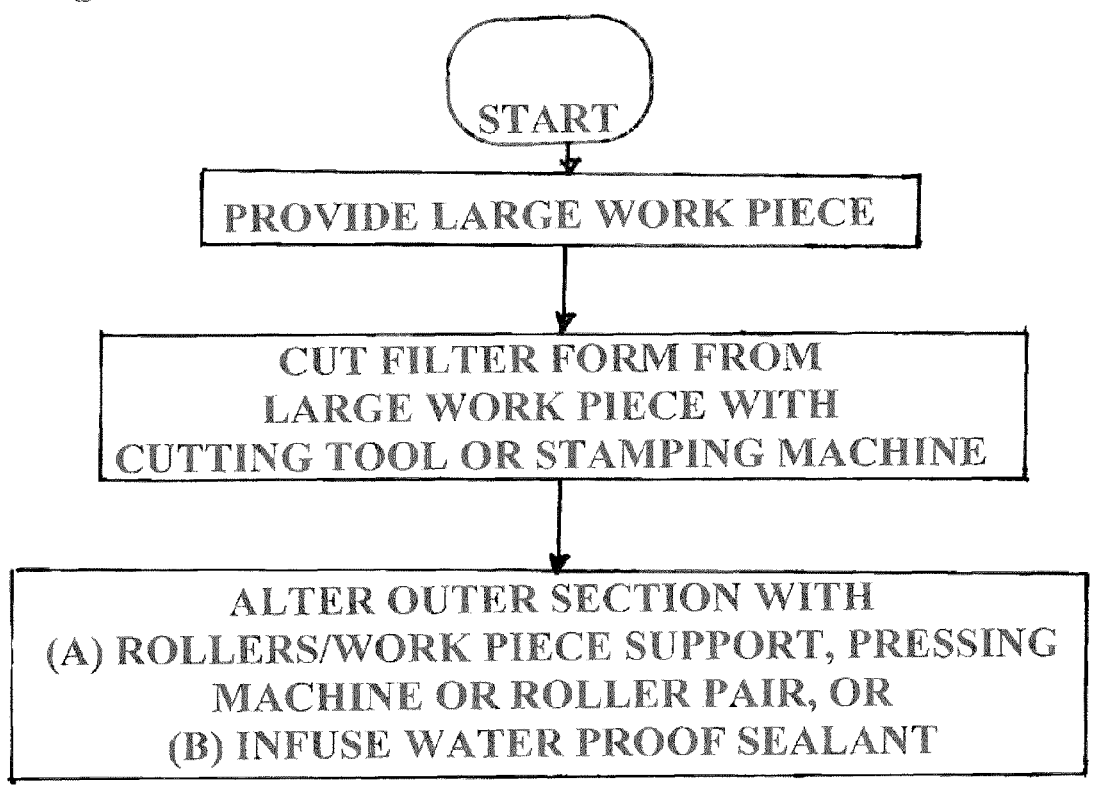
FIG. 4 is a logic flow chart of the method of the present invention.

Referring to FIG. 2A, in accordance with one aspect of the invention, a filter holder 20 is provided with a generally cylindrical shape. The holder 20 has a generally flat wire mesh open bottom 22 and a cylindrical wire mesh side wall 24 extending from the flat bottom 22 in a direction generally perpendicular to the flat bottom 22. The beverage ingredient filter 10 of FIGS. 1A-1C is folded to also have a generally cylindrical shape that conforms in size to the filter holder 20. The filter of FIG. 1C is placed within the filter holder, as seen in FIG. 2B, with the inner section 12 of the filter 10 resting on the flat bottom 22 of the holder 20. The cylindrical side section 24 of the filter holder 20 supports the outer section 14 of the beverage ingredient filter 10 in snug conforming cylindrical configuration. The outer section 14 is held in an upright position extending in a direction generally perpendicular to the bottom. The side wall 24 of the filter holder, being composed of wire mesh, is porous. Alternatively, the side wall 24 is composed of a nonporous material such as plastic Referring to FIG. 3, an alternative embodiment of a beverage ingredient filter 26 of the invention, having an inner circular section 28 made water permeable filter paper like that of the filter 10 of FIG. 1. The inner section 28 is joined continuously but is not integrally formed with the outer section 30. The outer section is cylindrical and made of water impermeable material other than altered filter paper. An outer perimeter 32 of the inner section 28 is joined to an inner perimeter 34 of the outer section 30.

The method of making the beverage ingredient filter 10 of FIGS. 1A-1C, includes the steps of forming, from disposable, water permeable, paper, filter stock 16 having an inner section 12 surrounded by an outer section 14 and altering the outer section 14 to render the outer section 14 water impermeable.

The method also includes the step of making both the inner section 12 and the outer section 14 from a single piece of filter paper 16 and altering the outer section 14 to render the outer section 14 impermeable to water. The step of altering includes the steps of dimensionally reducing the porous structure of the outer section relative to the inner section 12 until it is substantially water impervious relative to the inner section 12. Preferably, heat is applied with a hot platen, preferably a metal platen or the like, that is pressed against the outer section 14 to fuse together the distal micro parts of the outer section in a reduced state relative to the inner section 12.

Alternatively, the initial paper from which the filter 20 is made is nonfiltering paper and the central section 12 is treated mechanically or chemically to render it porous. The method of making a beverage ingredient filter 26 of FIG. 3, includes the steps of joining an inner section 28 of water permeable filter material to an outer section 34 made of water impermeable material surrounding the inner section 28 and folding the outer section 30 to form a cup with a generally cylindrical shape and a round bottom defining the inner section 28.

Preferably, the filter is made from a single piece of water permeable paper filter stock having a porous structure that is cut from a larger work piece. Preferably, the step of cutting is performed after the step of altering. Alternatively, the step of cutting is performed before the step of altering. Preferably, the step of altering includes the step of dimensionally reducing the porous structure of the outer section relative to the inner section until it is substantially water impervious relative to the inner section. The step of altering also includes the steps of fusing together the porous structure after the porous structure has been dimensionally reduced, and holding the outer section in a dimensionally reduced, nonporous state relative to the inner section through the holding power of the fusion after the step of dimensionally reducing the porous structure has terminated. This may be done by simultaneously pressing together the opposite sides of the outer section and heating the outer section while heating the outer section.

When the work piece is larger than the filter, the step of pressing together is performed while the filter is still an integral part of the larger work piece. This may be done by passing the work piece between a roller and a work piece support. In a radially outwardly extending annular pressing member carried by the roller against the work piece during rotation of the roller to dimensionally reduce the porous structure of the outer section.

In the case of using a roller, the step of cutting the filter from the work piece may be done concurrently with the step of pressing with the annular pressing member through use of a cutting tool carried by the roller. In such case, the pressing member carries a cutting tool defining a perimeter outer edge of the annular pressing member, and the step of cutting is performed by pressing the cutting tool substantially through the filter stock while the pressing tool presses the sides together of the outer section.

This pressing may be done by passing the filter stock between a pair of rollers instead of a single roller and a fixed support member. In either even, either the fixed support member or a support roller may be heated to provide the heat for fusion at the same time the step of pressing is performed.

In lieu of rollers, the step of pressing may also be performed with a pressing machine. In such case, the filter may be first cut to size before any alteration step is performed. In such case, the work piece is the same size as the filter. The step of cutting the filter to size may be a stamping machine or a separate roller that carries a cutting tool.

Generally, if the step of altering is performed by pressing when the work piece is flat and unfolded, then the next step is folding the outer section to form a substantially cylindrical wall extending upwardly from the inner section to form a substantially cylindrical filter with a permeable bottom and an impermeable substantially cylindrical side wall.

If instead of pressing, the step of altering includes the step of covering at least one side of the outer section with a water proof sealant or infusing the outer section with a water proof sealant, the altering may be performed after the step of folding and the wall dipped into a liquid sealant bath or sprayed with sealant while in a folded position.

While altering a porous work piece to make it nonporous is preferred, an alternate approach may be taken. In such alternative case, the method of making the beverage ingredient filter is achieved by performance of the steps of forming, from water impermeable paper-like stock, a body having an inner section defining a bottom surrounded by an outer section defining an encircling wall and altering the inner section to render the inner section water impermeable. The step of altering may be performed by mechanically altering the inner section such as forming a matrix of micro holes by piercing the inner section with a plurality of piercing needles. Alternatively, the inner section is stretched until it becomes relatively thinner and a porous structure develops. Alternatively, the inner section carries a water tight sealant that renders the inner section water impermeable, and the step of mechanically altering the inner section includes the step of degrading the sealant to render it relatively ineffective. Such degrading may include one of the steps of (a) heating the inner section to melt the sealant, (b) applying a solvent to the inner section to dissolve the sealant and (c) applying a reactant to alter the chemical composition of the sealant.

It is preferred that the inner section and outer wall section both be formed from a single work piece, but the filter may also be made by joining together two separate pieces. In such case, the beverage ingredient filter may be made by performance of the steps of providing an inner section of water permeable material to an outer section made of water impermeable material surrounding the inner section. The outer section may be preformed into a cylindrical shape or folded into the cylindrical shape after attachment.

More specifically, the invention contemplates a method of making an open and empty beverage ingredient filter by performance of the steps of (a) forming a relatively inwardly located, filtering, bottom section of beverage ingredient filter paper for support of beverage ingredient resting on the bottom section, the entire bottom section being continuously uniformly porous to allow a uniform flow of beverage uniformly and continuously across the entire bottom section, (b) forming a relatively outwardly located, nonfiltering, non-porous, side wall section of porous, beverage ingredient filter paper, (c) continuously and contiguously joining the side wall section to and surrounding the inner, bottom filtering section of beverage ingredient filter paper, and (d) extending the side wall section upwardly from the bottom to define a nonporous substantially cylindrical side wall being entirely and continuously nonporous from the bottom section to at least adjacent an open top through which ingredient may be dumped directly onto the bottom section, said nonporous substantially cylindrical side wall guiding water through substantially the full thickness of any ingredient being supported by the bottom and through all and only the filtering bottom section. Again, in such method, preferably, the inner bottom section and outer side wall section are integrally formed from a single piece of ingredient filter paper, and the bottom section filter paper has a porous structure that is water permeable when unaltered. The outer section is flattened to dimensionally reduce the porous structure of the bottom section to a dimensionally reduced state to reduce the porosity of, and render, the outer section substantially water impervious relative to the inner bottom section. The outer section is then secured in the dimensionally reduced, relatively water impervious state. This may be done by fusing the porous structure of the outer side wall section in a dimensionally reduced, flattened state relative to the inner section. The invention also contemplates a method of making a beverage ingredient filter assembly by performing the steps of (a) forming a flexible filter having an inner flat section and an outer wall section in which the inner bottom section is entirely made of continuously uniformly water permeable filter material and the outer wall section is entirely made of nonfiltering, water impermeable material continuously and contiguously joined to and surrounding the inner section, and (b) inserting the flexible filter into a relatively rigid filter holder, with (1) the inner flat section of the filter resting on a flat bottom of a holder with a flat bottom that is substantially, continuously, uniformly porous to enable uniform and continuous flow of beverage across the entire bottom section of the filter, and (2) the outer wall section being laterally supported in a configuration conforming to a side wall of the holder in an upright position perpendicular to the flat bottom and extending upwardly from the bottom to an open top. As noted before, preferably the inner section of the filter and the bottom of the holder are both round and the side wall of the holder has a cylindrical configuration extending upwardly in a general direction perpendicular to the round bottom of the holder.

The holder may be made of reusable material such as stainless steel or sturdy plastic or other plastic-like materials suitable for use with food. In such case the method includes the step of making another filter assembly by inserting another filter into the filter holder after a first filter has been removed from the holder after use. Alternatively, both the filter and the holder are made of inexpensive disposable materials that are intended to be use only once.

In accordance with the beverage brewing method of the present invention the ingredient is placed into the disposable, flexible, composite filter 10 having an inner, filtering, bottom section 12 and an outer nonfiltering water impervious wall section 14 joined to and extending in a direction that is generally perpendicular to the filtering bottom section 12. The disposable, flexible filter 10 is releasably mounted within a filter holder 20 having a porous bottom 22 to enable the passage of beverage, and a side 24 extending from the bottom 22 and in a direction that is generally perpendicular to the porous bottom 22. Then hot water is passed onto the ingredient while located within the filter 10 when the filter is being supportively held within the filter holder 20 to brew the ingredient and thereby make the brewed beverage. The beverage is dispensed through the inner, filtering, bottom section 12.

After the brew cycle has been completed, the filter 12 with the ingredient is removed from the holder 20 after the brewing is completed and both the spent ingredient, such as wet coffee grounds, and the filter are disposed of together.

In the case of the side of the filter holder 20 being porous passage of brewed beverage through the porous side of the filter holder 20 is prevented by the nonporous side 14 of the filter 10.

Before the brew cycle commences, the ingredient is arranged in a uniform layer across the bottom section of the filter to facilitate uniform saturation of the ingredient during the brew cycle.

While a preferred embodiment of the present invention has been disclosed in detail, it should be appreciated that many variations may be made with respect to the details of the preferred embodiment without departing from the scope of the invention as defined in the appended claims. While specifics have been provided as to techniques for making materials nonporous or porous or materials that are porous or non porous and other equivalent materials and techniques should be apparent to persons of ordinary skill in the art. For instance, reference may be made to U.S. Pat. No. 5,298,267 issued Mar. 29, 1994, to Gruenbacher and the references cited therein for such other techniques and materials, also, hereby incorporated by reference.

The invention claimed is:

1. A method of making a beverage ingredient filter, comprising the steps of:
    forming, from a work piece of water permeable paper filter stock having a porous structure, a filter having an inner section defining a bottom surrounded by an outer section defining an encircling wall;
    altering the outer section to render the outer portion water impermeable by dimensionally reducing the porous structure of the outer section relative to the inner section until it is substantially water impervious relative to the inner section;
    fusing together the porous structure after the porous structure has been dimensionally reduced; and
    holding the outer section in a dimensionally reduced, non-porous state relative to the inner section through the holding power of the fusion after the step of dimensionally reducing the porous structure has terminated.

2. The method of claim 1 including the step of cutting the filter from the work piece.

3. The method of claim 2 in which the step of cutting is performed after the step of altering.

4. The method of claim 2 in which the step of cutting is performed before the step of altering.

5. The method of claim 1 in which
    the outer section has opposite sides, and in which
    the step of fusing includes the step of simultaneously pressing together the opposite sides of the outer section and heating the outer section.

6. The method of claim 1 in which the step of fusing includes the step of heating the outer section.

7. The method of claim 1 in which
    the outer section has a pair of opposite sides, and
    the step of dimensionally reducing includes the step of pressing together the opposite sides.

8. The method of claim 1 in which the work piece is larger than the filter and the step of pressing together is performed while the filter is still an integral part of the work piece that is larger than the filter.

9. The method of claim 5 in which the step of pressing together is performed by passing the work piece between a roller and a work piece support.

10. The method of claim 5 in which the step of pressing includes the step of pressing a radially outwardly extending annular pressing member carried by the roller against the work piece during rotation of the roller to dimensionally reduce the porous structure of the outer section.

11. The method of claim 10 including a step of cutting the filter from the work piece concurrently with the step of pressing with the annular pressing member.

12. The method of claim 10 in which
    the step of cutting is performed by a perimeter outer edge of the annular pressing member substantially through the filter stock while the annular pressing member presses the sides together of the outer section.

13. The method of claim 5 in which the step of pressing is performed by passing the filter stock between a pair of rollers.

14. The method of claim 5 in which the step of pressing is performed with a pressing machine.

15. The method of claim 1 in which the work piece is the same size as the filter.

16. The method of claim 1 including the step of folding the outer section to form a substantially cylindrical wall extending upwardly from the inner section after the step of altering to form a substantially cylindrical filter with a permeable bottom and an impermeable substantially cylindrical side wall.

17. The method of claim 2 in which the step of cutting the filter from the work piece is performed with a stamping machine.

18. A method of making a beverage ingredient filter, comprising the steps of:
    forming, from water permeable paper filter stock having a porous structure, a filter having an inner section defining a bottom surrounded by an outer section defining an encircling wall; and
    altering the outer section to render the outer portion water impermeable, by infusing the outer section with a water proof sealant.

19. The method of claim 1 including the step of folding the outer section to form a substantially cylindrical wall before altering the outer section.

20. A method of making a beverage ingredient filter, comprising the steps of:
    forming, from a work piece of water permeable paper filter stock having a porous structure, a filter having an inner section defining a bottom surrounded by an outer section defining an encircling wall; and
    altering the outer section to render the outer portion water impermeable, folding the outer section to form a substantially cylindrical wall before altering the outer section by dipping the cylindrical wall into a liquid sealant bath to render the wall water impervious.

* * * * *